United States Patent Office 3,644,489
Patented Feb. 22, 1972

---

3,644,489
N,N-DICHLOROAMINE SALTS AND THEIR PREPARATION
Julius J. Fuchs, Wilmington, Del., assignor to E. I. du Pont de Nemours and Company, Wilmington, Del.
No Drawing. Continuation-in-part of application Ser. No. 745,974, July 19, 1968, now Patent No. 3,530,162, which is a continuation-in-part of application Ser. No. 661,491, July 11, 1967, which in turn is a continuation-in-part of application Ser. No. 397,022, Sept. 16, 1964, now Patent No. 3,346,554. This application Jan. 7, 1970, Ser. No. 1,322
Int. Cl. C07c *101/10, 101/20, 101/30*
U.S. Cl. 260—482 P         2 Claims

ABSTRACT OF THE DISCLOSURE

N,N-dichloroamine compounds, such as the sodium salt of 1 - (N,N-dichloroamino)cyclohexane carboxylic acid, are prepared by chlorinating the corresponding amine in the presence of water and a water immisible inert organic solvent such as carbon tetrachloride while maintaining an approximately neutral pH, through addition of a strongly basic acid acceptor such as sodium hydroxide. The N,N-dichloroamine compounds thus prepared are useful in preparing symmetrical azo compounds such as the di-sodium salt of azo-bis(cyclohexanecarboxylic acid).

CROSS-REFERENCE TO RELATED APPLICATIONS

This application is a continuation-in-part of my copending application Ser. No. 745,974, filed July 19, 1968, now U.S. Pat. No. 3,530,162, which in turn was a continuation-in-part of my then copending application Ser. No. 661,491, filed July 11, 1967, now abandoned, which in turn is a divisional application of my then copending application Ser. No. 397,022, Sept. 16, 1964, now U.S. Pat. No. 3,346,554.

BACKGROUND OF THE INVENTION

This invention relates to N,N-dichloroamine compounds of the formula (1)           

wherein $R_1$ is alkyl of 1 to 6 carbon atoms;
$R_2$ is alkyl of 1 to 6 carbon atoms or cycloalkyl of 3 to 6 carbon atoms; and
M is sodium or potassium; and wherein $R_1$ and $R_2$ taken together are cycloalkyl of 4 to 12 carbon atoms; and wherein $R_1$ or $R_2$ is substituted with alkoxy of 1 to 4 carbon atoms, carboxy, carbomethoxy, carboethoxy, phenyl, or from 1 to 3 chlorine atoms;
and to the preparation of these compounds from the corresponding amine compounds (2)           

wherein $R_1$ and $R_2$ are as described above, by chlorinating the amine in the presence of water, and a water immiscible organic solvent while maintaining an approximately neutral pH through addition of a strongly basic acid acceptor.

The N,N-dichloroamine compounds are useful in preparing symmetrical azo compounds as disclosed in U.S. Pat. No. 3,346,554.

The preparation of azo compounds and the use of amines and chlorine in the process are disclosed, for example, in Anderson, U.S. Pat. No. 2,711,405. However, the process disclosed there is limited to a relatively small class of azo-nitrile products because of low yields encountered with higher molecular weight reactants.

The preparation of chlorinated amine compounds is also old in the art. For example, Jackson et al., JACS vol. 69, June 1947, pages 15–39, disclose chlorination in an aqueous medium of amines such as butyl amine, in the presence of sodium bicarbonate. Jackson does not suggest the advantages attendant to the use of an organic solvent or the control of pH. Martin, U.S. Pat. No. 3,115,516, also discloses reaction of chlorine with an amine compound and discloses that the reaction can be carried out in an organic solvent or in a system in which the solvent is water. However, Martin discloses only procedures which entail having all of the base present at the beginning of the reaction. Reid, U.S. Pat. No. 3,137,728 discloses some N,N-dichloroamine compounds such as dichloroaminopropionic acid as suitable for use in preparing chloro-imines but does not disclose any acid salts nor means for preparing the acids nor their salts.

I have discovered that the compounds of Formula 1 can be prepared in exceptionally good yields by chlorinating the corresponding amine in a mixed water-organic solvent medium while maintaining an approximately neutral pH through the addition of a strongly basic acid acceptor. By this method, excessive product decomposition, which is caused by contact with an acid or base, is avoided by avoiding large excesses of either by-product acid or basic acid acceptor.

SUMMARY

In summary this invention is directed to compounds of Formula 1 and to the method of preparing them comprising:

(a) Contacting the corresponding amine with chlorine in the presence of water, and a water immiscible inert organic solvent, while adding an acid acceptor selected from the group consisting of the alkali metal and alkaline earth metal bases, at a rate sufficient to neutralize by-product HCl being formed and maintain a neutral to slightly basic pH, at a temperature above the freezing point and below the boiling point of the reaction mixture, the amine being present in an amount of from 1 to 25 percent based on the weight of amine, water and organic solvent, and the chlorine being used in an amount in excess of 2 moles per mole of amine;

(b) Acidifying the aqueous phase with enough mineral acid to liberate the free carboxylic acid;

(c) Separating the water phase from the organic solvent phase; and (d) Extracting the organic phase with aqueous caustic to obtain an aqueous solution of the salt of the N,N-dichloroamino compound.

By this method the N,N-dichloroamine products are obtained in exceptionally good yield because product decomposition is kept to a minimum.

DESCRIPTION OF THE INVENTION

Products

The products of this invention are the N,N-dichloroamine compounds of the formula (1)           

wherein $R_1$ is alkyl of 1 to 6 carbon atoms;
$R_2$ is alkyl of 1 to 6 carbon atoms or cycloalkyl of 3 to 6 carbon atoms; and
M is sodium or potassium; and wherein $R_1$ and $R_2$ taken together are cycloalkyl of 4 to 12 carbon aoms; and wherein $R_1$ or $R_2$ is substituted with a substituent selected from the group consisting of alkoxy of 1 to 4 carbon atoms, carboxy, carbomethoxy, carboethoxy, phenyl, and from 1 to 3 chlorine atoms.

Preparation

The compounds of Formula 1 are prepared by reacting the corresponding amine with chlorine in accordance with the conditions described above.

The reaction can be carried out in any suitable reaction vessel, preferably one equipped with means for agitating the contents.

The reaction is conducted at temperatures ranging from above the freezing point to below the boiling point of the reaction mixture. For maximum reaction efficiency, the reaction temperature will preferably range from about $-10°$ C. to $+10°$ C.

The amount of chlorine used in the reaction is in excess of 2 moles of chlorine per mole of amine compound. The chlorine can be added over any time period but is preferably added over a period of about 30 minutes to avoid rapid formation of large amounts of by-product hydrochloric acid in the reaction system. Large amounts of hydrochloric acid in the reaction system, as indicated by a low pH, cause accelerated product decomposition.

The amount of amine compound used in the reaction can range from about 1 to about 25 percent based on the weight of amine and solvent. Preferably the amine compound is used in an amount ranging from about 2 to about 15 percent by weight to achieve maximum reaction efficiency.

As mentioned above, the reaction is carried out in the presence of water and a water immiscible organic solvent. Good agitation is usually required to maintain adequate mixing of the two phases. The organic solvents suitable are water immiscible organic liquids which are inert and thus do not enter into the reaction. Representative of suitable organic solvents are methylene chloride, carbon tetrachloride, chloroform, benzene, dichlorobenzene, and trichloroethylene.

Representative of suitable acid acceptors are the alkali metal bases and alkaline earth metal bases. For economy and convenience, the hydroxides, carbonates and bicarbonates of sodium and potassium are preferred.

The acid acceptor is added at a rate slightly in excess of that needed to neutralize the hydrochloric acid being formed, thereby maintaining an approximately neutral pH or having present only a small excess of base in the reaction system. Care should be taken to avoid a large excess or deficiency of acid acceptor as product decomposition is accelerated at either very high or very low pH. However, such extremes can be of course be tolerated for short periods of time without extensive product decomposition.

At the completion of the chlorination the aqueous phase is acidified with sufficient mineral acid to liberate the free carboxylic acid. This permits the product to transfer from the aqueous phase to the organic phase. Of the suitable mineral acids hydrochloric is preferred. Sufficient acid is used to react with all of the product salt and a small excess of acid is ordinarily preferred. By this step the product is transferred to the organic phase, separating it from the bulk of the by-product salts and impurities which remain in the aqueous phase.

The organic phase is then extracted with aqueous caustic to reform the product salt and the product N,N-dichloroamine can be recovered from the aqueous layer, after separating the organic phase, by stripping the solvent off of the product through simple concentration procedures, either at atmospheric pressure or under vacuum.

Utility

As pointed out above, the N,N-dichloroamine compounds of this invention are most useful in preparing symmetrical azo compounds. The preparation of the azo compounds from the products of this invention is explained in U.S. Pat. No. 3,346,554.

This invention is further exemplified in the following illustrative examples wherein parts and percentages are by weight unless otherwise noted.

EXAMPLE 1

A solution of 82.5 parts of the sodium salt of 1-aminocyclohexane carboxylic acid in 200 parts of water, and 200 parts of methylene chloride is treated at 0–5° C. with 71 parts of chlorine gas and 80 parts of 50% sodium hydroxide. The sodium hydroxide is added at such a rate that the pH of the reaction mixture remains between 7 and 10. After the reaction is completed, 50 parts of 36% hydrochloric acid are added at the same temperature to liberate the free acid. The aqueous layer, which contains the dissolved sodium chloride, is then separated. After addition of 200 parts of water to the organic phase with good agitation, followed by the addition of 50% sodium hydroxide to give a pH of 9, the aqueous phase is separated, which now contains the sodium salt of N,N-dichloroaminocyclohexane carboxylic acid in over 90% yield, as measured by iodine liberation.

EXAMPLES 2–18

By substituting molecular equivalent amounts of the amine starting materials shown below for the amine compound of Example 1, the corresponding N,N-dichloroamino compounds are obtained.

| Amine starting material | N,N-dichloroamino product |
|---|---|
| 2. Sodium 2-amino-2,4-dimethyl-pentanoate. | Sodium 2-(N,N-dichloroamino)-2,4-dimethylpentanoate. |
| 3. Sodium 2-amino-2-methyl propionate. | Sodium 2-(N,N-dichloroamino)-2-methyl propionate. |
| 4. Potassium 1-amino-cyclobutane-carboxylate. | Potassium 1-(N,N-dichloroamino)-cyclobutanecarboxylate. |
| 5. Potassium 2-amino-2-cyclopropyl propionate. | Potassium 2-(N,N-dichloroamino)-2-cyclopropylpropionate. |
| 6. Sodium 2-amino-2-cyclopentyl propionate. | Sodium 2-(N,N-dichloroamino)-2-cyclopentyl propionate. |
| 7. Sodium 1-amino-2-methyl cyclohexanecarboxylate. | Sodium 1-(N,N-dichloroamino)-2-methyl cyclohexanecarboxylate. |
| 8. Potassium 2-amino-2-ethyl butyrate. | Potassium 2-(N,N-dichloroamino)-2-ethyl butyrate. |
| 9. Sodium 2-amino-2-hexyl octanoate. | Sodium 2-(N,N-dichloroamino)-2-hexyl octanoate. |
| 10. Sodium 1-amino-cyclododecane carboxylate. | Sodium 1-(N,N-dichloroamino)-cyclododecane carboxylate. |
| 11. Sodium 1-amino-cyclooctane carboxylate. | Sodium 1-(N,N-dichloroamino)-cyclooctane carboxylate. |
| 12. Sodium 1-amino-cyclopentane carboxylate. | Sodium 1-(N,N-dichloroamino)-cyclopentane carboxylate. |
| 13. Potassium 2-amino-2,4-dimethyl-4-methoxy pentanoate. | Potassium 2-(N,N-dichloroamino)-2,4-dimethyl-4-methoxy pentanoate. |
| 14. Dipotassium 2-amino-2-methyl glutarate. | Dipotassium 2-(N,N-dichloroamino)-2-methyl glutarate. |
| 15. Sodium 2-amino-2-methyl-3-phenyl propionate. | Sodium 2-(N,N-dichloroamino)-2-methyl-3-phenyl propionate. |
| 16. Sodium 2-amino-2-methyl-3-methoxy propionate. | Sodium 2-(N,N-dichloroamino)-2-methyl-3-methoxy propionate. |
| 17. Sodium 2-amino-2-methyl-5-chloro pentanoate. | Sodium 2-(N,N-dichloroamino)-2-methyl-5-chloro pentanoate. |
| 18. Sodium 2-amino-2-methyl-5,5,5-trichloro pentanoate. | Sodium 2-(N,N-dichloroamino)-2-methyl-5,5,5-trichloro pentanoate. |

I claim:

1. A process for preparing an N,N-dichloroamine compound of the formula:

(1)
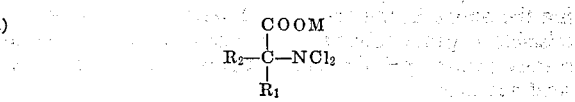

wherein
R₁ is alkyl of 1 to 6 carbon atoms;
R₂ is alkyl of 1 to 6 carbon atoms or cycloalkyl of 3 to 6 carbon atoms;
M is sodium or potassium; and
wherein R₁ and R₂ taken together are cycloalkyl of 4 to 12 carbon atoms; and wherein R₁ or R₂ is substituted with a substituent selected from the group consisting of alkoxy of 1 to 4 carbon atoms, carboxy, carbomethoxy, carboethoxy, phenyl and from 1 to 3 chlorine atoms;

comprising (a) contacting an amine compound of the formula:

(2) 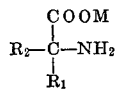

wherein
R₁, R₂ and M are defined for Formula 1, with chlorine in the presence of water, and a water immiscible inert organic solvent, while adding an acid acceptor selected from the group consisting of the alkali metal and alkaline earth metal bases at a rate sufficient to neutralize the by-product HCl being formed and maintain a neutral to slightly basic pH, at a temperature above the freezing point and below the boiling point of the reaction mixture, the amine being present in an amount of from 1 to 25 percent based on the weight of amine, water and organic solvent, and the chlorine being used in an amount in excess of 2 moles per mole of amine, (b) acidifying the aqueous phase to liberate the free carboxylic acid, (c) separating the aqueous phase from the organic phase and (d) extracting the organic phase with aqueous caustic to obtain an aqueous solution of the salt of the N,N-dichloroamine compound.

2. N,N-dichloroamine compounds of the formula:

(1) 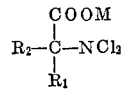

wherein
R₁ is alkyl of 1 to 6 carbon atoms;
R₂ is alkyl of 1 to 6 carbon atoms or cycloalkyl of 3 to 6 carbon atoms; and
M is sodium or potassium; and
wherein R₁ and R₂ taken together are cycloalkyl of 4 to 12 carbon atoms; and wherein R₁ or R₂ is substituted with a substituent selected from the group consisting of alkoxy of 1 to 4 carbon atoms, carboxy, carbomethoxy, carboethoxy, phenyl and from 1 to 3 chlorine atoms.

References Cited
UNITED STATES PATENTS 3,137,728   6/1964   Reid ---------------- 260—566

LORRAINE A. WEINBERGER, Primary Examiner

R. GERSTL, Assistant Examiner

U.S. Cl. X.R.

260—514 R, 518 A, 534 R, 534 E, 534 M